United States Patent Office 2,754,333
Patented July 10, 1956

2,754,333
PROCESS FOR THE PREPARATION OF DITHIODIALKYLENE GLYCOLS

John F. McCarthy, Jr., Levittown, Pa., assignor to Thiokol Chemical Corporation, Trenton, N. J., a corporation of Delaware No Drawing. Application April 6, 1954,
Serial No. 421,433

3 Claims. (Cl. 260—608)

This invention relates to dithiodialkylene glycols.

The principal object of the invention is to provide a new and improved process for the preparation of dithiodialkylene glycols.

A dithiodialkylene glycol may be defined as any substituted or unsubstituted bis (beta hydroxy ethyl) disulfide and may be written

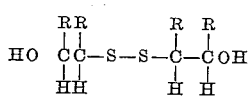

where R is hydrogen, an alkyl or an aryl group. The commonest and most important species has the formula $$HOC_2H_4SSC_2H_4OH$$

and may be termed "dithiodiglycol."

In accordance with the invention an alkylene oxide and hydrogen sulfide are reacted in the presence of an aqueous solution of an alkali thiosulfate. The thiosulfate may be partly converted to sulfite during the reaction but the portion so converted may be regenerated by the addition of sulfur. The molar concentration of alkaline thiosulfate varies from 0.5 to 4.0. The reaction is carried out within a pH range above 8.5 when the thiosulfate is of the group consisting of sodium thiosulfate and potassium thiosulfate and 7.9 to 8.5 when ammonium thiosulfate is used. The reaction is carried out within a temperature range of 20° C. to 60° C.

Alkylene oxides in general may be used, including ethylene oxide, propylene oxide and butylene oxide.

The alkylene oxide and hydrogen sulfide may be reacted simultaneously or successively. Sulfur is also included in the reaction, either in the form of free sulfur added to the reaction mixture or in the form of thiosulfate.

The stoichiometrical relation between alkylene oxide, hydrogen sulfide and sulfur, according to the present invention, is indicated by the following reaction:

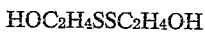

In this equation, ethylene oxide is used as an example of alkylene oxides in general.

In a batch process the reaction will continue as long as sulfur is available, either in the form of thiosulfate or free sulfur, in the ratio of not less than 1 atom of sulfur to 1 mol hydrogen sulfide. The reaction may, however, be carried out continuously and in this case free sulfur preferably is added to the reaction mixture to which hydrogen sulfide and alkylene oxide are continuously added. The concentration of alkaline thiosulfate then remains constant.

The invention will be illustrated by the following specific examples:

Example 1 shows the disadvantage of a relatively low pH range during the reaction, using sodium or potassium thiosulfate, as evidenced by the undesirably high proportion of mercaptan (shown by the SH value) in the product, by comparison of Example 1 with Examples 2 to 5, 7 and 8, where a higher pH is used, with sodium or potassium thiosulfate.

In the following examples, room temperature means 20° C.–25° C.

*Example 1.—Example of the reaction carried out at a pH of 8*

10 mols, that is, 2500 cc. of $Na_2S_2O_3$ (4 molar solution) were put in a reaction flask equipped with inlet tubes, and ethylene oxide and hydrogen sulfide were bubbled into the solution of sodium thiosulfate. The pH was adjusted to between 8.0 and 8.2 by regulation of the rate of flow of $H_2S$. The reaction required a total of about 2¼ hours and was carried out at room temperature. At the end of the reaction the solution obtained was put in a separatory funnel and allowed to stand over night. Oil separated to the top of the solution on standing. This oil weighed 120 grams and was subjected to a low vacuum for 2 hours to remove unreacted hydrogen sulfide. It was dried over night with 18 grams of anhydrous sodium sulfate. After filtration, analysis of the separated oil gave the following values:

| | Per cent |
|---|---|
| Sulfur | 38.5 |
| SH radical | 9.6 |
| OH radical | 28.85 |

The aqueous layer from the reaction after separation of the dithiodiglycol was extracted 5 times with n-butyl alcohol. The alcohol extract was neutralized with acetic acid, then distilled using a short distillation column. After all of the n-butanol had been removed by distillation, the residue consisting of dithiodiglycol was filtered. The analysis of the extracted product gave the following values:

| | Per cent by weight |
|---|---|
| Sulfur | 38.8 |
| SH radical | 8.5 |
| OH radical | 27.8 |

Theoretical values are:

| | Per cent |
|---|---|
| Sulfur | 41.5 |
| SH radical | 0 |
| OH radical | 22 |

*Example 2*

This example illustrates the reaction carried out at a pH of 12. 2500 cc. of a 4-molar solution of sodium thiosulfate were treated simultaneously with ethylene oxide and hydrogen sulfide. The pH was held at 12–12.4, using a pH meter. The time of reaction was 2 hours during which the temperature rose from room temperature to 44° C. This reaction solution was put into a separatory funnel and allowed to stand over night. The next day the liquid had separated into two layers, giving an upper layer of dithiodiglycol weighing 169 grams when wet. This was held under a 20 mm. vacuum for 2 hours to remove excess hydrogen sulfide and then dried over night using 15% by weight of anhydrous sodium sulfate. The dithiodiglycol after drying over night was filtered and weighed 140 grams. On analysis it gave the following values:

| | Per cent |
|---|---|
| Sulfur | 36.7 |
| OH radical | 21.9 |

*Example 3.—Illustrating the use of pH 10*

Proceed as in the previous examples except using 2 liters of 3.5 molar sodium thiosulfate solution. The reaction was maintained at a pH of 10–10.5 by adjustment of the rate of feed of $H_2S$ and ethylene oxide and was carried out for 1½ hours. The solution temperature varied between room temperature and 44° C. Separation and extraction of the aqueous phase were carried out as in the previous examples. The analytical values obtained were:

For the separated dithiodiglycol:

| | Per cent |
|---|---|
| Sulfur | 39.9 |
| SH radical | 0.029 |
| OH radical | 10.6 |

The analytical values for the product obtained by extraction were:

| | Per cent |
|---|---|
| Sulfur | 40.8 |
| OH radical | 24.5 |

*Example 4*

This example illustrates the use of intermittent feeding of ethylene oxide and hydrogen sulfide.

2 liters of 3.5 molar solution of $Na_2S_2O_3$ in water were treated intermittently with ethylene oxide and hydrogen sulfide over a period of 2 hours. During this reaction time the temperature varied between room temperature and 39° C. The pH varied between 9 and 12. The initial solution of sodium thiosulfate had a pH of approximately 7 but as ethylene oxide was added the pH rose due to the formation of sodium hydroxide to a pH of 12, as determined by use of a pH meter. As soon as the pH reached 12, the feed of ethylene oxide was stopped and feed of $H_2S$ was started. The $H_2S$ reacted with the NaOH in the solution to lower the pH and the use of $H_2S$ was continued until the pH had dropped to 9. The feed of the two reagents was thus carried out until the end of the reaction time by feeding in ethylene oxide to a pH of 12, followed by hydrogen sulfide until the pH had dropped back to 9. The pH value thus proved a convenient method for indicating reaction of the two reagents in stoichiometrical proportions. The product was separated and treated as in the previous examples. Analytical figures obtained were as follows:

| Separated dithiodigycol: | Per cent |
|---|---|
| Sulfur | 42.6 |
| SH radical | 0.4 |
| OH radical | 23.9 |
| Extracted dithiodiglycol: | |
| Sulfur | 40.3 |
| SH radical | 0.15 |
| OH radical | 24.8 |

*Example 5*

Proceed as in Example 4 except using a pH range of 10–13, and a temperature range from room temperature to 49° C. The reaction was held to the pH range by intermittent feeding of ethylene oxide and hydrogen sulfide and separation of the product was carried out as in the previous examples. Analytical values gave the following results:

| Separated dithiodiglycol: | Per cent |
|---|---|
| Sulfur | 38.1 |
| SH radical | 0.41 |
| OH radical | 22.5 |
| Extracted dithiodiglycol: | |
| Sulfur | 41.4 |
| SH radical | --- |
| OH radical | 23.9 |

*Example 6*

This example illustrates the use of ammonium thiosulfate.

2 liters of 60% ammonium thiosulfate solution were treated, using the intermittent feed as described in the previous example with ethylene oxide and hydrogen sulfide over a period of 3½ hours. The temperature rose during this period from room temperature to 54° C. A pH range above 8.5 was desired but the pH could not be made to go above 8.5 and the reaction was therefore run between 7.9 and 8.5 pH. The product obtained by separation gave the following analysis:

| | Per cent |
|---|---|
| Sulfur | 38.23 |
| OH radical | 20.68 |

None of the product was found remaining in the aqueous phase in this reaction.

*Example 7*

Proceed as in the previous example using instead of ammonium thiosulfate a 3.5 molar solution of potassium thiosulfate. A pH range of 9–12 was maintained by intermittent feeding of ethylene oxide and hydrogen sulfide. The time of reaction was 2 hours and the temperature rose from room temperature to 42° C. The product obtained in this example gave the following analytical figures:

| | Per cent |
|---|---|
| Sulfur | 37.72 |
| OH radical | 21.75 |

*Example 8.—Illustrating the use of propylene oxide in the reaction*

Proceed as in Example 4 using propylene oxide instead of ethylene oxide. An intermittent feed was used with a pH range of 9–12. The time of reaction was 1¾ hours and a temperature range from room temperature to 42° C. The propylene oxide being a liquid was added dropwise to the solution and the pH changes were slower than those obtained when ethylene oxide was used. The dithiodipropylene glycol product of this reaction was separated as before and analysis gave the values of:

| | Per cent |
|---|---|
| Sulfur | 32.31 |
| OH radical | 20.6 |
| Theoretical values: | Per cent |
| Sulfur | 30.6 |
| OH radical | 18.9 |

*Example 9*

This example illustrates the reaction carried out using sodium sulfite, sulfur, ethylene oxide and hydrogen sulfide.

584 grams of sodium sulfite in the form of a 3.5 molar solution were treated with 150 grams of sulfur. This mixture was stirred and ethylene oxide was added until the pH of the solution was brought to 10. It was then maintained at 10 by alternately feeding the ethylene oxide and hydrogen sulfide. The addition of the ethylene oxide and hydrogen sulfide took place during a 4-hour period with continuous stirring. At the end of that time the solution obtained from the reaction was put in a separatory funnel, the oil separated and was removed. Purification of this oil by filtration and drying gave dithiodiglycol. The aqueous phase contained a negligible amount of $Na_2S_2O_3$.

*Example 10*

This example illustrates the reaction of sodium thiosulfate, sulfur, ethylene oxide and hydrogen sulfide to produce dithiodiglycol.

840 grams of sodium thiosulfate in the form of a 3.5 molar solution were treated with 150 grams of sulfur and to this solution there was added, first, ethylene oxide, followed by hydrogen sulfide. The ethylene oxide was added until the pH reached 10 and the pH of the reaction was maintained at 10 by adjustment of the rates of addition of ethylene oxide and hydrogen sulfide. The addition of these gases required 4 hours during which continuous stirring was maintained. The reaction mixture was placed in a separatory funnel and an oil layer separated. This oil was filtered and dried and proved to be dithiodiglycol containing a small amount of dissolved sulfur. The analysis for sulfur gave 47.26% instead of the theoretical value of 41.54%. The aqueous phase remaining contained approximately the amount of thiosulfate originally present.

*Example 11*

This example illustrates the re-use of the aqueous liquid remaining after removal of dithiodiglycol when the reaction is run as in Example 10.

6.69 mols of sodium thiosulfate were dissolved in water and diluted to 2 liters giving a 3.35 molar solution of sodium thiosulfate. This solution was reacted intermittently with 187 grams ethylene oxide and 112 grams hydrogen sulfide and 119 grams of dithiodiglycol were recovered.

The aqueous phase, after removal of the dithiodiglycol, was heated with excess sulfur until analysis showed no sulfite to be present. This solution was filtered and then the reaction continued. 177 grams ethylene oxide and 115 grams hydrogen sulfide were again reacted and separation of dithiodiglycol obtained in the reaction gave 168 grams, which were removed and purified as previously described.

The aqueous sodium thiosulfate solution was again regenerated as before by heating with excess sulfur. The solution was filtered free of excess sulfur and again reacted with 117 grams ethylene oxide and 25 grams hydrogen sulfide. The dithiodiglycol separated as a heavy oil which was removed in a separatory funnel and purified as before. The yield was 184 grams. The increasing yield on these three steps is presumably due to dithiodiglycol which was dissolved in the solution and did not separate out in the first part of this example.

*Example 12*

This example illustrates the use of styrene oxide for reaction with sodium thiosulfate to produce a phenyl substituted dithiodiglycol.

4 mols of sodium thiosulfate were dissolved in a 50–50 mixture of water and acetone, to give a solution containing 480 grams of sodium thiosulfate per liter. The mixture was vigorously stirred and styrene oxide was added slowly until the pH rose somewhat above 10 after the addition of about 30 grams of styrene oxide. $H_2S$ was then added to adjust the pH to 10 and the subsequent rate of addition of styrene oxide and hydrogen sulfide were such that the pH was maintained at 10. After a mol (120 grams) of styrene oxide had been added the mixture was heated to 40° C. and with stirring was kept at a pH of 10 by addition of $H_2S$. The mixture was allowed to stand over night and after removal of the acetone by evaporation the oil was separated and purified. Analytical results indicated that the diphenyl-dithiodiglycol obtained was contaminated with a small amount of mercaptan.

What is claimed is:

1. The process of making a dithiodialkylene glycol which comprises reacting an alkylene oxide and hydrogen sulfide in the presence of an aqueous solution of a thiosulfate of the group consisting of ammonium thiosulfate, sodium and potassium thiosulfate having a molar concentration of 0.5 to 4, the pH range of said solution during the reaction being 7.9 to 8.5 when ammonium thiosulfate is used and above 8.5 when a thiosulfate of the group consisting of sodium thiosulfate and potassium thiosulfate is used, the temperature range of the reaction being 20° C. to 60° C., and the molar ratio of alkylene oxide to hydrogen sulfide being 2:1.

2. The process of making a dithiodialkylene glycol which comprises reacting an alkylene oxide, hydrogen sulfide and sulfur in the presence of an aqueous solution of a thiosulfate of the group consisting of ammonium thiosulfate, sodium and potassium thiosulfate, having a molar concentration of 0.5 to 4, the pH range of said solution during the reaction being 7.9 to 8.5 when ammonium thiosulfate is used and above 8.5 when a thiosulfate of the group consisting of sodium thiosulfate and potassium thiosulfate is used, the temperature range of the reaction being 20° C. to 60° C., the molar ratio of alkylene oxide to hydrogen sulfide being 2:1, and the ratio of the mols of hydrogen sulfide to atoms of sulfur being not more than 1 to 1.

3. The process of making a dithiodialkylene glycol which comprises reacting an alkylene oxide and hydrogen sulfide in the presence of an aqueous solution of a thiosulfate of the group consisting of ammonium thiosulfate, sodium and potassium thiosulfate having a molar concentration of 0.5 to 4, the pH range of said solution during the reaction being 7.9 to 8.5 when ammonium thiosulfate is used and above 8.5 when a thiosulfate of the group consisting of sodium thiosulfate and potassium thiosulfate is used, the temperature range of the reaction being 20° C. to 60° C., and the molar ratio of alkylene oxide to hydrogen sulfide being 2:1, whereby a portion of said thiosulfate is converted to sulfite, removing the dithiodialkylene glycol from the aqueous solution, and adding sulfur to said aqueous solution to regenerate thiosulfate from said sulfite.

References Cited in the file of this patent

UNITED STATES PATENTS 2,527,378     Bertozzi _____ Oct. 24, 1950

OTHER REFERENCES

Mellor: Comprehensive Treatise on Inorganic and Theoretical Chemistry, vol. 10, page 518.

Fieser et al.: Organic Chemistry, 2nd ed. (Heath—1950), page 32.